United States Patent
Kuroda et al.

(10) Patent No.: US 9,104,397 B2
(45) Date of Patent: Aug. 11, 2015

(54) COMPUTER AND DATA SAVING METHOD

(71) Applicant: Hitachi, Ltd., Chiyoda-ku, Tokyo (JP)

(72) Inventors: Yuki Kuroda, Musashino (JP); Masashi Takada, Kokubunji (JP); Yasuyuki Kudo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 209 days.

(21) Appl. No.: 13/649,873

(22) Filed: Oct. 11, 2012

(65) Prior Publication Data
US 2013/0097451 A1 Apr. 18, 2013

(30) Foreign Application Priority Data
Oct. 14, 2011 (JP) .................. 2011-227244

(51) Int. Cl.
  *G06F 11/07* (2006.01)
  *G06F 1/30* (2006.01)
  *G06F 1/26* (2006.01)
  *G06F 11/14* (2006.01)
(52) U.S. Cl.
  CPC ...... *G06F 1/30* (2013.01); *G06F 1/263* (2013.01); *G06F 11/1441* (2013.01)
(58) Field of Classification Search
  CPC ....... G06F 1/30; G06F 11/0796; G06F 21/88; G11C 5/005
  USPC .................................... 714/14, 22
  See application file for complete search history.

(56) References Cited

U.S. PATENT DOCUMENTS

| | | | |
|---|---|---|---|
| 5,920,728 A * | 7/1999 | Hallowell et al. | 713/340 |
| 2001/0020940 A1* | 9/2001 | Nakazato et al. | 345/418 |
| 2005/0117418 A1* | 6/2005 | Jewell et al. | 365/202 |
| 2005/0132150 A1* | 6/2005 | Jewell et al. | 711/154 |
| 2008/0025126 A1* | 1/2008 | Jewell et al. | 365/228 |
| 2011/0197036 A1* | 8/2011 | Ishii | 711/155 |
| 2011/0225345 A1 | 9/2011 | Inoue et al. | |

FOREIGN PATENT DOCUMENTS

| | | |
|---|---|---|
| JP | 2006-172355 A | 6/2006 |
| JP | 2006-178858 | 7/2006 |
| JP | 2011-160596 A | 8/2011 |
| JP | 2011-524555 | 9/2011 |
| JP | 2011-221724 A | 11/2011 |
| WO | WO 2010/064280 A1 | 6/2010 |

* cited by examiner

*Primary Examiner* — Chae Ko
(74) *Attorney, Agent, or Firm* — Crowell & Moring LLP (57) ABSTRACT

It is provided a computer comprising a nonvolatile memory for storing data, a control processor for controlling the saving of data into the nonvolatile memory, and a battery for supplying power to the computer in case of a failure of an external power supply, wherein the control processor checks a charge amount stored in the battery, calculates an amount of data which can be saved in the nonvolatile memory by the battery in case of a failure of the external power supply based on the checked charge amount, and saves data excluding the amount of data that can be saved, out of data which should be saved into the nonvolatile memory, into the nonvolatile memory in advance.

9 Claims, 7 Drawing Sheets

COMPUTER AND DATA SAVING METHOD

CLAIM OF PRIORITY

The present application claims priority from Japanese patent application JP 2011-227244 filed on Oct. 14, 2011, the content of which is hereby incorporated by reference into this application.

BACKGROUND OF THE INVENTION

The present invention relates to a computer and particularly to a technology pertaining to data saving in case of a power outage and data recovery at the time of power recovery.

Conventionally, a server system in a data center, a hospital or the like includes an uninterruptible power supply (UPS) and can continue to operate even in case of a failure such as a power outage. Specifically, the system is continuously operated by starting up a private power generator during a continuous operation using the UPS.

JP 2006-172355 A1 discloses a technology for reducing power consumption of a battery power supply while protecting cache data by a control in conformity with data classification in a cache memory and a battery remaining amount in a case where an external power supply is interrupted due to a failure as a technology to recover from the failure.

SUMMARY OF THE INVENTION

In the conventional system using the USP, there have been problems of high cost of the battery used in the UPS and high installation cost. Further, it has not been possible in some cases to safely stop the system in case where the private power generator is not provided and in case where the supply of power is assumed to stop for a long time.

Considering the above problems, the present invention aims to provide a computer capable of stopping a system less costly and safely.

To solve the above problems, configurations as claimed are, for example, adopted.

The representative one of inventions disclosed in this application is outlined as follows. There is provided a computer comprising a nonvolatile memory for storing data, a control processor for controlling the saving of data into the nonvolatile memory, and a battery for supplying power to the computer in case of a failure of an external power supply. The control processor checks a charge amount stored in the battery, calculates an amount of data which can be saved in the nonvolatile memory by the battery in case of a failure of the external power supply based on the checked charge amount, and saves data excluding the amount of data that can be saved, out of data which should be saved into the nonvolatile memory, into the nonvolatile memory in advance.

According to a typical example disclosed in this application, a system can be stopped less costly and safely.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, an embodiment of the present invention is described with reference to the drawings. It should be noted that the same elements are, in principle, denoted by the same reference signs in all the drawings showing the embodiment and not repeatedly described.

Figure 1:
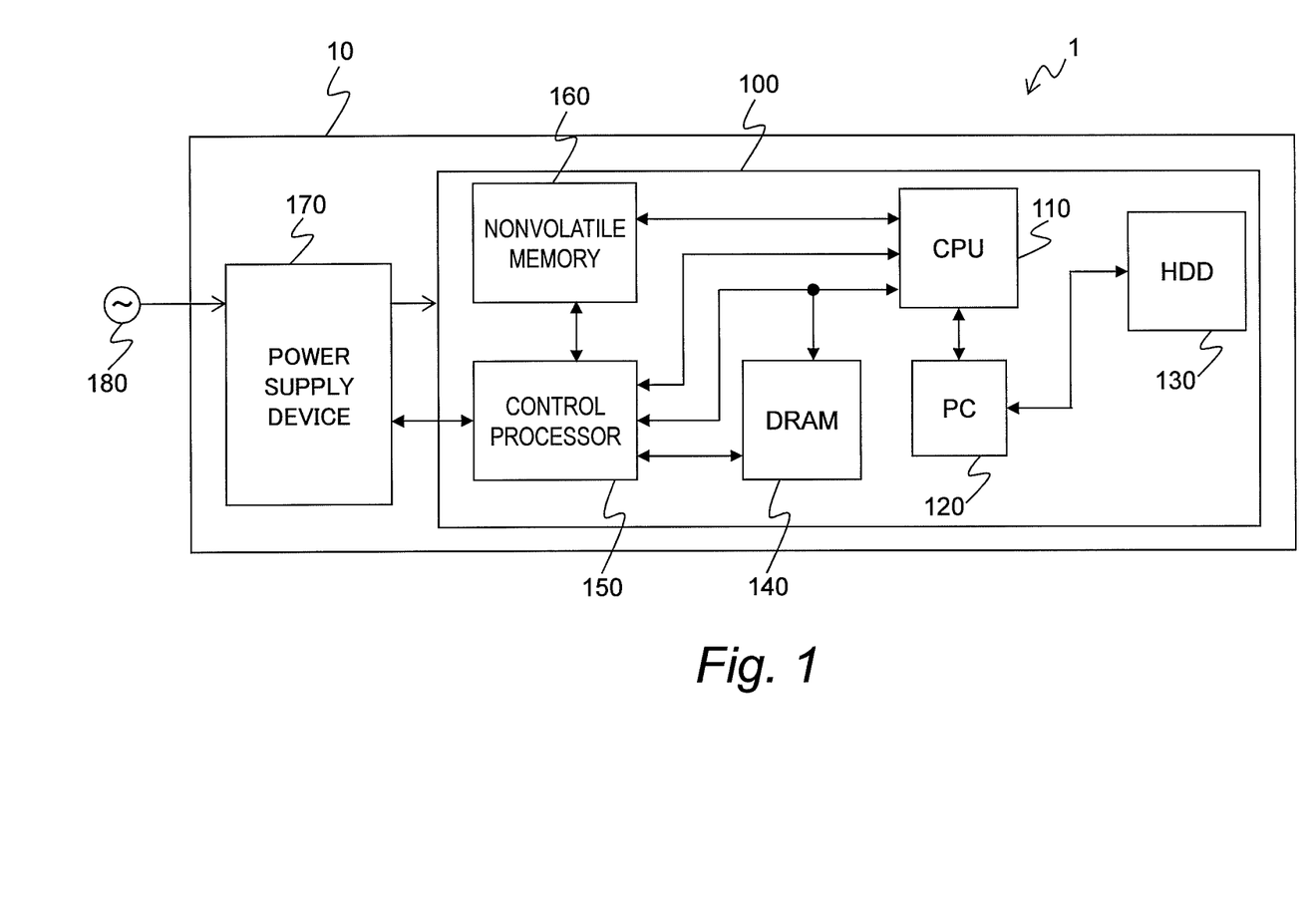
FIG. 1 is a diagram showing an example of a configuration of an information processing apparatus according to an embodiment of a present invention.

FIG. 1 is a diagram showing an example of the configuration of an information processing apparatus (computer) 1 according to the embodiment of the present invention.

The information processing apparatus 1 includes a mother board 100 and a power supply device 170 in the same chassis 10. A CPU (Central Processing Unit) 110, a PC (Peripheral Controller) 120, a HDD (Hard Disk Drive) 130, a DRAM (Dynamic Random Access Memory) 140, a control processor 150, a nonvolatile memory 160 and the like are mounted on the mother board 100.

The CPU 110 is an arithmetic processing unit and includes a register and a cache memory which are not shown. The PC 120 is a control device for performing a communication control with a peripheral device (e.g. HDD 130 in FIG. 1). The HDD 130 is a nonvolatile storage device for recording various pieces of information.

The DRAM 140 is a volatile storage device. The control processor 150 is an arithmetic processing unit for executing a data saving process and a data recovery process according to the embodiment of the present invention. The nonvolatile memory 160 is a nonvolatile storage device such as a flash memory.

It should be noted that the HDD 130 and the nonvolatile memory 160 are collectively called "nonvolatile storage devices" below. Further, the register and the cache memory of the CPU 110 and the DRAM 140 are collectively called "volatile storage devices".

The power supply device 170 includes a battery 250 (see FIG. 2) to be described later, and supplies power to the mother board 100 in case where the power from an external power supply 180 is interrupted, i.e. in case of a power outage. The power supply device 170 is described in detail later using FIG. 2. The external power supply 180 is a power supply outside for feeding power to the mother board 100 via the power supply device 170.

Figure 2:
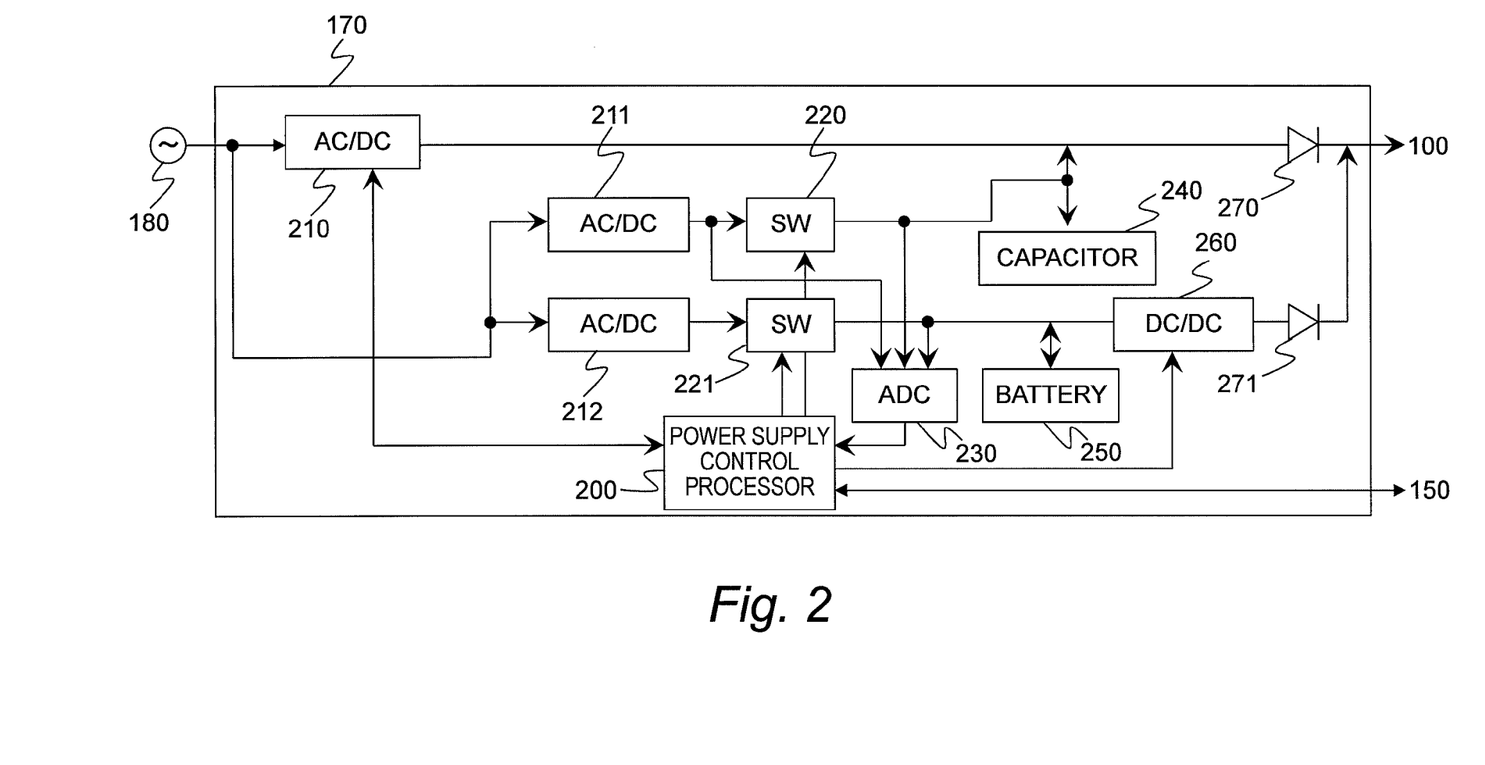
FIG. 2 is a diagram showing an example of a configuration of a power supply device according to the embodiment of the present invention.

FIG. 2 is a diagram showing an example of the configuration of the power supply device 170 according to the embodiment of the present invention.

The power supply device 170 includes a power supply control processor 200, AC/DC converters 210, 211 and 212, switches 220 and 221, an A/D converter 230, a capacitor 240, the battery 250, a DC/DC converter 260, diodes 270 and 271, wiring and the like.

The power supply control processor 200 controls the entire power supply device 170. Specifically, the power supply control processor 200 executes an operation of checking the operation of the AC/DC converter 210, on/off switching of the switches 220 and 221, on/off switching of the DC/DC converter 260, and a charged state of the capacitor 240 and the battery 250 based on an output signal of the A/D converter 230.

The AC/DC converters 210 to 212 convert alternating current power input from the external power supply 180 into direct current power. The switches 220 and 221 switch on/off a current. For example, in case where the switch 220 is on, the direct current power output from the AC/DC converter 211 is input to the capacitor 240. That is, the capacitor 240 is charged. The A/D converter 230 converts a voltage value indicated by an analog quantity into a voltage value indicated by a digital quantity.

The capacitor 240 is a small-capacity condenser capable of dealing with momentary power interruption. The battery 250 is a small-capacity storage battery or a condenser having a larger capacity than the capacitor 240.

The DC/DC converter 260 converts the input direct current power into direct current power having a different voltage. The diodes 270 and 271 are electronic devices having a rectifying action (action to allow a current to flow only in a specified direction).

During a normal operation, the alternating current power from the external power supply 180 is supplied to the power supply device 170. The supplied alternating current power is fed to the mother board 100 via the diode 270 after being converted into direct current power in the AC/DC converter 210. Further, the supplied alternating current power is fed to the capacitor 240 via the switch 220 after being converted into direct current power in the AC/DC converter 211. Furthermore, the supplied alternating current power is fed to the battery 250 via the switch 221 after being converted into direct current power in the AC/DC converter 212.

Here, power stored in the capacitor 240 is fed to the mother board 100 in case of momentary power interruption (power flicker), i.e. in case where the power from the external power supply 180 is interrupted for about several microseconds.

On the other hand, in case where the power from the external power supply 180 is interrupted for a period exceeding several microseconds, the power supply control processor 200 checks the occurrence of a power outage based on an output value of the A/D converter 230 (specifically, an output voltage value of the AC/DC converter 211 input to the A/D converter 230). Thereafter, the power supply control processor 200 notifies the occurrence of the power outage to the control processor 150. In addition, the power supply control processor 200 starts up the DC/DC converter 260. Then power charged in the battery 250 to be fed to the mother board 100 via the diode 271.

Further, the power supply control processor 200 determines charged states and failure states of the capacitor 240 and the battery 250 based on an output value of the A/D converter 230 (specifically, output voltages of the capacitor 240 and the battery 250, temperature information, information on charge/discharge current and the like input to the A/D converter 230). Thereafter, the power supply control processor 200 notifies the charged states and the failure states of the capacitor 240 and the battery 250 to the control processor 150.

It should be noted that notification may be made by writing data into a storage area in the control processor 150 or may be made by writing data into an external storage area readably by the control processor 150.

Figure 3:
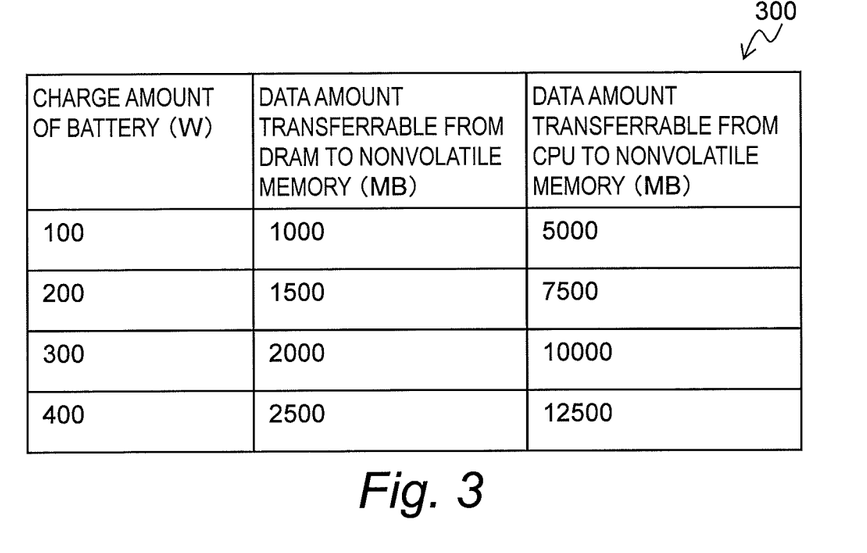
FIG. 3 is an explanatory diagram showing an example of a transferable data information table according to the embodiment of the present invention.

FIG. 3 shows an example of a transferable data information table 300 according to the embodiment of the present invention.

Information indicating a correspondence relationship between a charge amount (remaining charge amount) of the battery 250 and a data amount transferable to the nonvolatile memory 160 using the charge amount of the battery 250 is stored in the transferable data information table 300. The transferable data information table 300 is generated in advance and stored in the nonvolatile memory 160 (see FIG. 1).

In an example shown in FIG. 3, the charge amount (unit: watt) of the battery 250, the data amount (unit: megabyte) transferable from the DRAM 140 to the nonvolatile memory 160 and the data amount (unit: megabyte) transferable from the CPU 110 (strictly speaking, register and cache memory in the CPU 110) to the nonvolatile memory 160 are related to each other.

It should be noted that the data amount transferable from the CPU 110 to the nonvolatile memory 160 may differ depending on the type of the memory, i.e. the register or the cache memory, in the CPU 110 and a transfer method.

Further, in the transferable data information table 300, parameter values of a calculation formula may be stored instead of each specific value shown in FIG. 3. For example, in the example shown in FIG. 3, the data amount transferable from the DRAM 140 to the nonvolatile memory 160 is expressed by "5X+500" in case where the charge amount of the battery 250 is "X". Similarly, the data amount transferable from the CPU 110 to the nonvolatile memory 160 is expressed by "25X+2500". Thus, parameter values of each of these calculation formulas may be stored. In this case, the control processor 150 calculates a data amount transferable to the nonvolatile memory 160 based on the calculation formula using the stored parameter values and the charge amount of the battery 250.

Figure 4:
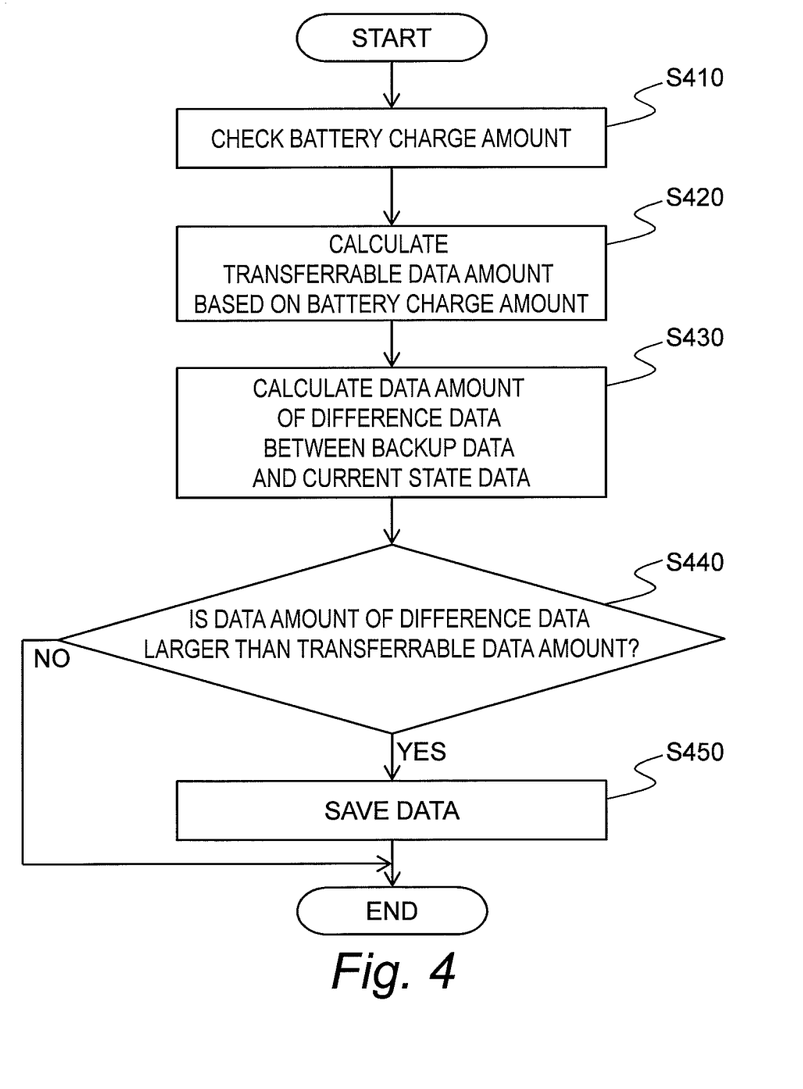
FIG. 4 is a flow chart showing a data saving operation corresponding to a charge amount of a battery according to the embodiment of the present invention.

FIG. 4 is a flow chart showing a data saving operation corresponding to the charge amount of the battery 250 according to the embodiment of the present invention.

Here is described an operation of the information processing apparatus 1 to save data into the nonvolatile memory 160 in advance according to the charge amount (remaining amount) of the battery 250 during a normal operation (in the non-occurrence of a power outage).

First, in Step S410, the power supply control processor 200 checks the charge amount of the battery 250. The power supply control processor 200 calculates the charge amount of the battery 250 by comparing an output value of the A/D converter 230 (specifically, output voltage of the battery 250, temperature information, information on charge/discharge currents and the like input to the A/D converter 230) and characteristic data of the battery 250. Thereafter, the power supply control processor 200 notifies information on the calculated charge amount of the battery 250 to the control processor 150. It should be noted that the power supply control processor 200 regularly checks the charge amount of the battery 250.

Subsequently, in Step S420, the control processor 150 calculates a data amount transferable to (can be saved in) the nonvolatile memory 160 by the battery 250 in case of a power outage based on the remaining amount of the battery 250 calculated in Step S410 and the transferable data information table 300 (see FIG. 3).

Thereafter, in Step S430, the control processor 150 calculates a data amount of difference data between backup data and current state data. The backup data is the last data backed up (saved) from the volatile storage device to the nonvolatile storage device. The current state data is data currently stored in the volatile storage device. That is, the difference data may be data updated from the backup data (hereinafter, referred to as "updated data") and data which should be saved in the nonvolatile storage device.

It should be noted that the control processor 150 may calculate the data amount of the updated data by checking a dirty bit of a TLB (Translation Look-aside Buffer) in the CPU 110.

Here, the TLB is a cache in the CPU 110 and a conversion table for managing mapping information indicating a correspondence relationship between a virtual address used when the CPU 110 executes a program and a physical address on the DRAM 140 by the size, for example page (or block). The TLB is managed by an operating system (OS) installed in the information processing apparatus 1 and holds a part of the mapping information managed by a page table on the DRAM 140.

Further, the TLB manages the dirty bit (dirty flag) indicating whether data in each page has been updated. Thus, in case where the dirty bit corresponding to a predetermined page is dirty (set at 1), data in a virtual address (data stored in the cache memory in the CPU 110) corresponding to the predetermined page has been updated. On the other hand, data in a physical address (data stored in the DRAM 140) corresponding to the predetermined page has not been updated. That is, the data in the physical address and the data in the virtual address corresponding to the predetermined page is the updated data.

It should be noted that, in Step S430, the control processor 150 may obtain a write target address and the size of data to be written based on a write command to the DRAM 140 issued by the CPU 110 and calculate the data amount of the above updated data.

Further, in Step S430, the control processor 150 adds an entry to an updated data information table 500 (to be described later using FIG. 5) and writes the address, data size, priority and update time of the updated data respectively in an update address (backup source address) 501, a data size 503, a priority 506 and an update time 507. The detail of each attribute is described later using FIG. 5.

Thereafter, in Step S440, the control processor 150 compares the data amount of the difference data (updated data) calculated in Step S430 and the data amount transferable in case of a power outage calculated in Step S420. In case where the data amount of the difference data is smaller than the data amount transferable in case of a power outage (No in S440), the difference data can be saved also in case of a power outage and needs not be saved in advance. Thus, the process is terminated.

On the other hand, in case where the data amount of the difference data is larger than the data amount transferable in a power outage (Yes in S440), data is saved in the nonvolatile storage device in advance so that the data amount of the difference data becomes smaller than the data amount transferable in case of a power outage (S450). For example, in case where the data amount of the difference data is 3000 MB and the data amount transferable in case of a power outage is 1000 MB, data of 2000 MB out of the difference data of 3000 MB excluding (subtracting) 1000 MB is saved in the nonvolatile storage device in advance. This enables the remaining difference data of 1000 MB to be reliably saved in case of a power outage. Thereafter, the process is terminated.

It should be noted that, in Step S450, the control processor 150 may save the difference data in a decreasing order of the priority 506 with reference to the priority 506 (see FIG. 5) set for the difference data.

Further, in saving the data in Step S450, the control processor 150 writes a save destination address in a backup destination address 502 of the updated data information table 500 (see FIG. 5) corresponding to the data. Further, the control processor 150 writes a save completion flag indicating that saving has been completed in a save flag 504 or 505. That is, in case where the save destination is the HDD 130, the save flag 505 is set as "1". On the other hand, in case where the save destination is the nonvolatile memory 160, the save flag 504 is set as "1".

As described above, the control processor 150 saves the updated data into the nonvolatile memory 160 in advance according to the charge amount of the battery 250 during the normal operation of the information processing apparatus 1. It should be noted that a reduction in the processing of the CPU 110 can be prevented by not the CPU 110, but the control processor 150 executing a series of operations.

Figure 5:
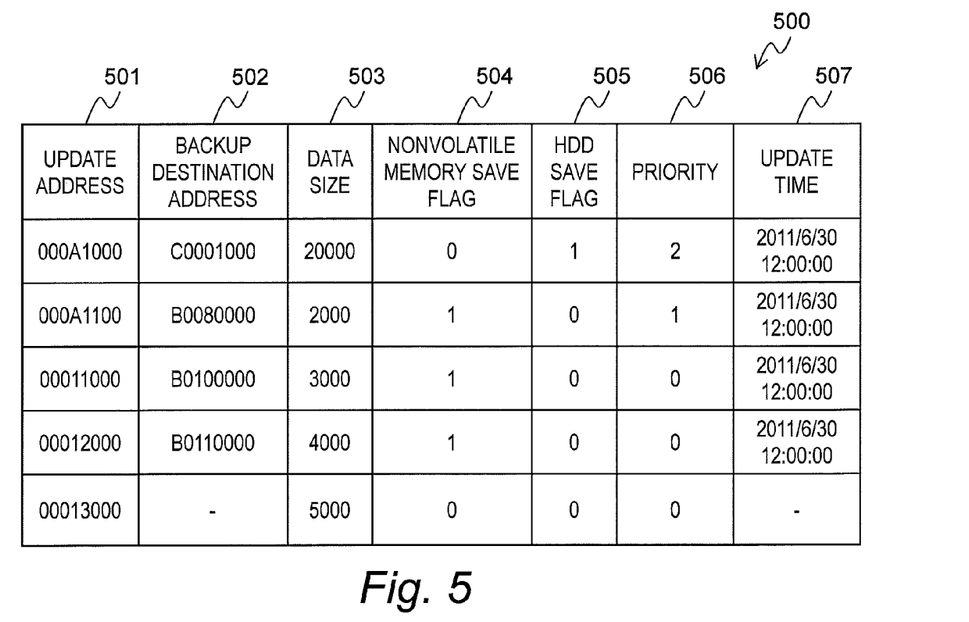
FIG. 5 is an explanatory diagram showing an example of an updated data information table according to the embodiment of the present invention.

FIG. 5 shows an example of the updated data information table 500 according to the embodiment of the present invention.

The updated data information table 500 stores information on the updated data that should be saved in the nonvolatile storage devices. The updated data information table 500 is stored in the nonvolatile memory 160 (see FIG. 1).

In the example shown in FIG. 5, information including the update address 501, the backup destination address 502, the data size 503, the nonvolatile memory save flag 504, the HDD save flag 505, the priority 506 and the update time 507 are stored with relations each other as information on the updated data.

The update address 501 is a backup source address (initial address indicating the arrangement on the DRAM 140 or the cache memory of the CPU 110) of the updated data. The backup destination address 502 is an initial address indicating the arrangement on the nonvolatile storage device as the backup destination of the updated data.

The data size 503 is size of the updated data. That is, data from the initial address indicated by the update address 501 to an address offset by the size indicated by the data size 503 is the updated data.

The nonvolatile memory save flag 504 is a flag indicating whether the save destination of the updated data is the nonvolatile memory 160. In case where the updated data is saved in the nonvolatile memory 160, in the save flag 504 is set as "1". Otherwise, "0" is set.

The HDD save flag 505 is a flag indicating whether the save destination of updated data is the HDD 130. In case where the updated data is saved in the HDD 130, the save flag 505 is set as "1". Otherwise, the save flag 505 is set as "0".

The priority 506 is information indicating a priority pertaining to data saving of each updated data. Upon saving data, updated data having a high priority 506 is preferentially saved. The priority 506 is given according to the type and use frequency of an application program using the updated data. For example, the priority of the updated data is set to be higher for an application program having a higher degree of importance according to a degree of importance of each application program set in advance by a user. Further, the priority of the updated data is set to be higher for an application program having a higher use frequency. This enables the updated data having a high priority to be saved even in case where perfect data saving cannot be performed by any chance.

The update time 507 is information indicating time of updating the updated data. The update time 507 is recorded after the processing of Step S403 of FIG. 4 and when the updated data is saved. At the time of power recovery, the data configuration before the data saving can be restored by recovering the data in a time order of the update time 507.

In the updated data information table 500 described above, the backup source address of the updated data and the backup destination address in the nonvolatile memory 160 are respectively recorded in the update address 501 and the backup destination address 502 and the nonvolatile memory save flag 504 is set as "1" in case where the updated data is saved in the nonvolatile memory 160. Thereafter, in case where the updated data is saved in the HDD 130, the nonvolatile memory save flag 504 is set as "0" and the HDD save flag 505 is set as "1". Further, in case where the updated data stored in the DRAM 140 is saved in the HDD 130, an address on the DRAM 140 as a save source and an address on the HDD 130 as a save destination are respectively recorded in the update address 501 and the backup destination address 502 and the HDD save flag 505 is set as "1".

Figure 6:
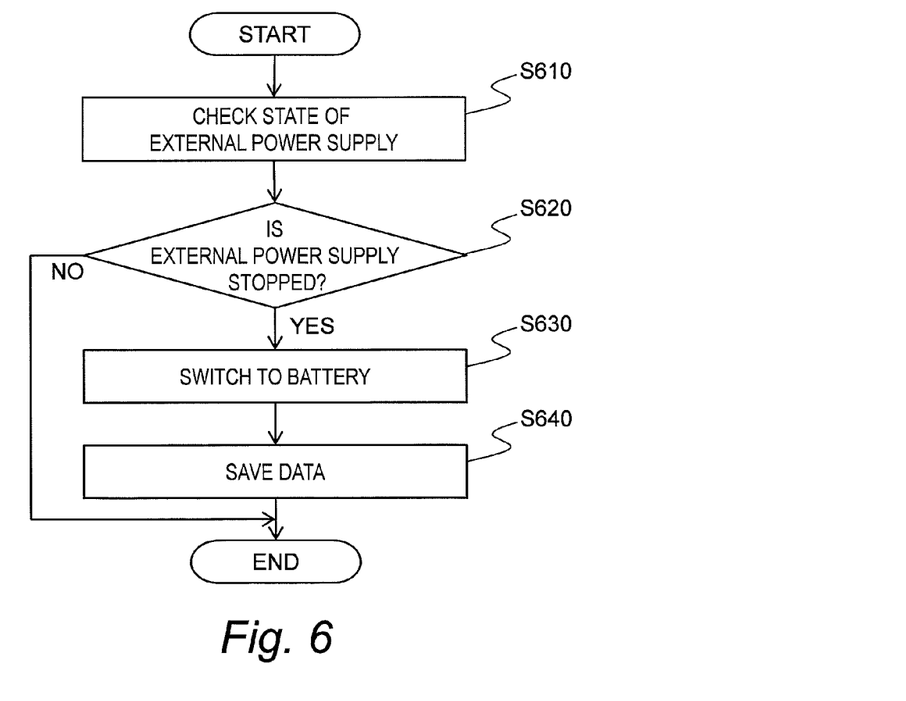
FIG. 6 is a flow chart showing an example of a control logic of a data saving process of a power supply control processor in case of a power outage according to the embodiment of the present invention.

FIG. 6 is an example of a flow chart showing a control logic of the data saving process of the power supply control processor 200 in case of a power outage according to the embodiment of the present invention.

Here is described the data saving process in case where the power from the external power supply 180 is stopped to enter a so-called power outage state.

First, in Step S610, the power supply control processor 200 checks a state of the external power supply 180. Specifically, the power supply control processor 200 monitors the power from the external power supply 180 based on an output value of the A/D converter 230. For example, the power supply control processor 200 periodically checks the power from the external power supply 180.

Subsequently, in Step S620, the power supply control processor 200 determines whether the power from the external power supply 180 is stopped, based on the output value of the A/D converter 230. In case where the power from the external power supply 180 is not stopped (No in S620), the process is terminated (S650) since the data saving process in a power outage is not necessary.

On the other hand, in case where the power from the external power supply 180 is stopped (Yes in S620), the power supply control processor 200 starts the DC/DC converter 260 and switches to drive the mother board 100 based on power fed from the battery 250 (S630). In Step S630, the mother board 100 is driven by power from the capacitor 240 until a switch is made to power feeding by the battery 250.

Thereafter, in Step S640, the power supply control processor 200 notifies the switch to the power feeding by the battery 250 to the control processor 150 and the control processor 150 saves data. Data saving by the control processor 150 is described later using FIG. 7. Thereafter, the process is terminated (S650).

By the process described above, the power supply control processor 200 saves the data in case where the power from the external power supply 180 is stopped to enter the so-called power outage state.

Figure 7:
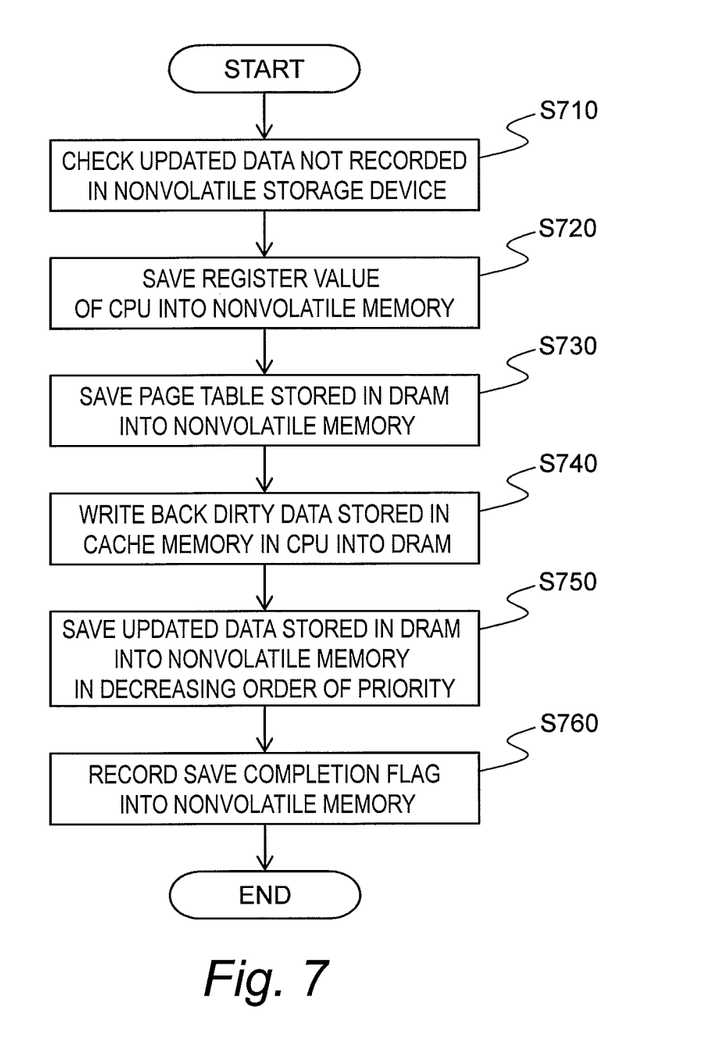
FIG. 7 is a flow chart showing an example of a control logic of a data saving process of a control processor in case of a power outage according to the embodiment of the present invention.

FIG. 7 is an example of a flow chart showing a control logic of the data saving process of the control processor 150 in case of a power outage according to the embodiment of the present invention. Here, the processing in Step S640 of FIG. 6 is described in detail.

First, in Step S710, the control processor 150 checks the updated data that is not recorded in the nonvolatile storage device out of each updated data registered in the updated data information table 500 (see FIG. 5). Specifically, the updated data for which the save flags 504 and 505 are both set as "0" in the updated data information table 500 is checked.

Subsequently, in Steps S720 and S730, the control processor 150 saves a register value of the CPU 110 and the page table stored in the DRAM 140 into the nonvolatile memory 160 respectively.

Thereafter, in Step S740, the control processor 150 writes data in a page for which the dirty bit is dirty (i.e. dirty data), out of data stored in the cache memory in the CPU 110, back to the DRAM 140 (write-back). Here, the dirty data is data stored in the cache memory in the CPU 110 and updated that is different from the content of the data stored in the DRAM 140 by a writing operation executed by the CPU 110.

Thereafter, in Step S750, the control processor 150 saves the updated data stored in the DRAM 140 into the nonvolatile memory 160 in a decreasing order of the priority 506 set for each pieces of updated data. Here, the updated data stored in the DRAM 140 is difference data between the data stored in the DRAM 140 after the write-back process in Step S740 and the last data backed up in the nonvolatile storage devices from the DRAM 140.

Thereafter, in Step S760, the control processor 150 records the save completion flag indicating the completion of data saving into a specific area of the nonvolatile memory 160. It should be noted that, in case of a failure of data saving, information on the failure may be recorded.

By the above process, the control processor 150 saves the data in case of a power outage.

It should be noted that the processings of Steps S720 to S730 may be executed after the processings of Steps S740 to S750. Further, although the updated data stored in the DRAM 140 is saved in the nonvolatile memory 160 after the dirty data stored in the cache memory in the CPU 110 is written back to the DRAM 140 by the processings of Steps S740 and S750, there is no limitation to this case. For example, both the dirty data stored in the cache memory in the CPU 110 and the updated data stored in the DRAM 140 may be saved into the nonvolatile memory 160 without performing the write-back to the DRAM 140.

Figure 8:
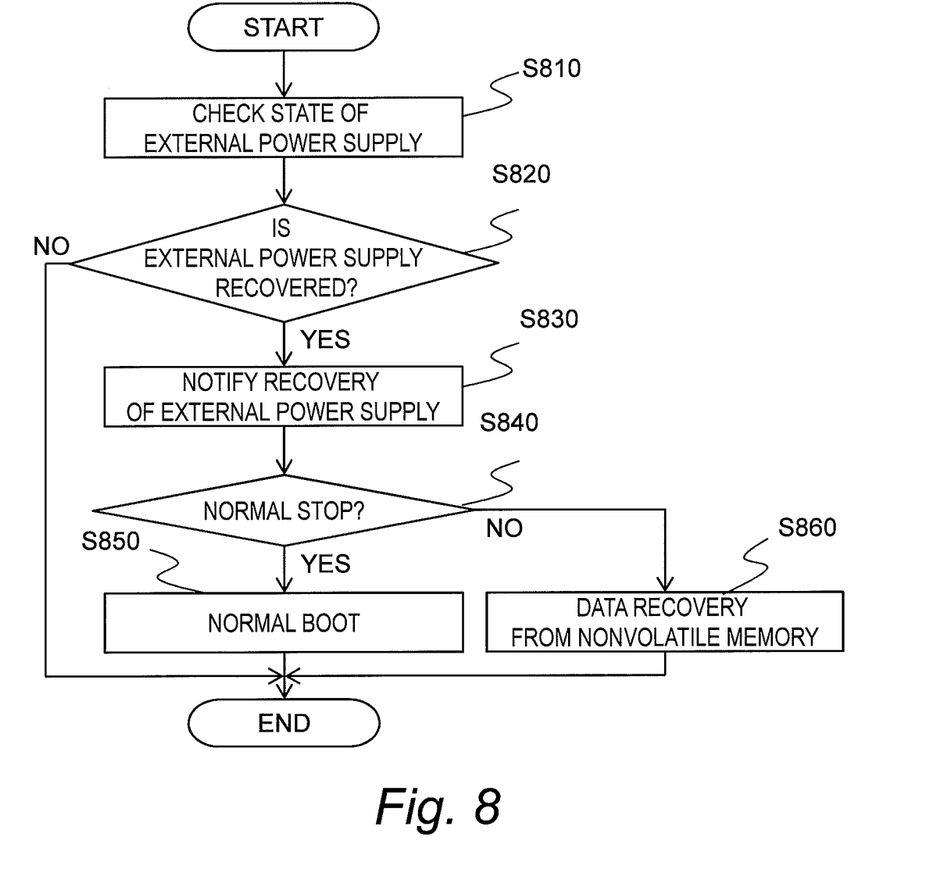
FIG. 8 is a flow chart showing an example of a control logic of a data recovery process in case of power recovery according to the embodiment of the present invention.

FIG. 8 is an example of a flow chart showing a control logic of the data recovery process at the time of power recovery according to the embodiment of the present invention.

Here is described the data recovery process in case where the power from the external power supply 180 is recovered, i.e. when a normal state is recovered.

First, in Step S810, the power supply control processor 200 checks a state of the external power supply 180. Specifically, the power supply control processor 200 monitors the power from the external power supply 180 based on an output value of the A/D converter 230. It should be noted that the power supply control processor 200 operates with power supplied from the recovered external power supply 180 and other power supplies. Further, the power supply control processor 200 periodically checks the power from the external power supply 180.

In case where the power from the external power supply 180 is not recovered (No in S820), the power supply control processor 200 terminates the process since the data recovery process cannot be executed. Thereafter, the control logic shown in FIG. 8 is repeated again after the elapse of a predetermined period of time.

On the other hand, in case where the power from the external power supply 180 is recovered (Yes in S820), the power supply control processor 200 notifies the recovery of the power from the external power supply 180 to the control processor 150 (S830).

Thereafter, in Step S840, the control processor 150 determines whether the last stop (shutdown of the information processing apparatus 1 in case of a power outage) is a normal stop. Specifically, the control processor 150 determines whether the last stop is a normal stop by reading the save completion flag (see Step S760 of FIG. 7) stored in the nonvolatile memory 160.

In case where the last stop is not a normal stop (No in S840), i.e. if the save completion flag is set as "1", the control processor 150 recovers the data by transferring the data saved in the nonvolatile memory 160 to an original position (register or cache memory in the CPU 110 or DRAM 140) (S860). In Step S860, the control processor 150 transfers the data in a time order of the update time 507 (see FIG. 5) with reference to the updated data information table 500. This is to ensure consistency for the data with the overlapping update address 501.

In case where the last stop is a normal stop (Yes in S840), i.e. if the save completion flag is set as "0", the control processor 150 performs a normal boot process by executing a boot program stored in the HDD 130 (S850). It should be noted that in case where the boot program is stored in the nonvolatile memory 160, the control processor 150 may perform the normal boot process by executing the boot program stored in the nonvolatile memory 160.

According to the above process, the information processing apparatus 1 executes the data recovery process in case where the power from the external power supply 180 is recovered, i.e. when the so-called normal state is recovered.

As described above, according to the information processing apparatus 1 of the embodiment of the present invention, it is possible to stop and recovery of a system less costly and safely by using the small-size and small-capacity battery 250.

While the present invention has been described in detail and pictorially in the accompanying drawings, the present invention is not limited to such detail but covers various obvious modifications and equivalent arrangements, which fall within the purview of the appended claims.

What is claimed is:

1. A computer comprising
   a nonvolatile memory for storing data,
   a control processor for controlling the saving of data into the nonvolatile memory, and
   a battery for supplying power to the computer in case of a failure of an external power supply,
   wherein the control processor:
   checks a charge amount stored in the battery;
   calculates an amount of data which can be saved in the nonvolatile memory by the battery in case of a failure of the external power supply based on the checked charge amount; and
   saves data excluding the amount of data that can be saved, out of data which should be saved into the nonvolatile memory, into the nonvolatile memory in advance.

2. The computer according to claim 1, wherein the control processor calculates an amount of the data that should be saved in the nonvolatile memory by using a dirty bit of a translation look-aside buffer (TLB) provided in the computer.

3. The computer according to claim 1, further comprising
   a processor for controlling the computer and
   a volatile memory for storing the data that should be saved in the nonvolatile memory,
   wherein the control processor calculates the amount of the data that should be saved into the nonvolatile memory from the volatile memory based on a write command for writing data into the volatile memory issued by the processor.

4. The computer according to claim 1, wherein the battery is a condenser.

5. The computer according to claim 1, wherein the battery, the control processor and the nonvolatile memory are implemented in the same chassis.

6. The computer according to claim 1, wherein:
   a priority is set for each piece of the data that should be saved; and
   the control processor saves the data into the nonvolatile memory in a decreasing order of the priority.

7. The computer according to claim 6, wherein the priority is set according to a degree of importance given to each application program which uses the piece of the data.

8. The computer according to claim 6, wherein the priority is set according to a use frequency of each application program which uses the piece of the data.

9. A data saving method executed in a computer including a nonvolatile memory for storing data, a control processor for controlling the saving of data into the nonvolatile memory, and a battery for supplying power to the computer in case of a failure of an external power supply, the data saving method including the steps of:
   checking, by the control processor, a charge amount stored in the battery;
   calculating, by the control processor, an amount of data which can be saved in the nonvolatile memory by the battery in case of a failure of the external power supply based on the checked charge amount; and
   saving, by the control processor, data excluding the amount of data that can be saved, out of data which should be saved into the nonvolatile memory, into the nonvolatile memory in advance.

* * * * *